United States Patent
Hajimiri (12)

(10) Patent No.: US 12,034,481 B2
(45) Date of Patent: Jul. 9, 2024

(54) OPTICALLY ENABLED RF PHASED-ARRAYS FOR DATA TRANSMISSION

(71) Applicant: California Institute of Technology, Pasadena, CA (US)

(72) Inventor: Seyed Ali Hajimiri, La Canada, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 17/476,375

(22) Filed: Sep. 15, 2021

(65) Prior Publication Data

US 2022/0085886 A1 Mar. 17, 2022

Related U.S. Application Data

(60) Provisional application No. 63/104,948, filed on Oct. 23, 2020, provisional application No. 63/078,817, filed on Sep. 15, 2020.

(51) Int. Cl.
| | | |
|---|---|---|
| *H04B 10/2575* | (2013.01) | |
| *G06F 1/10* | (2006.01) | |
| *H04B 10/25* | (2013.01) | |
| *H04B 10/54* | (2013.01) | |

(Continued)

(52) U.S. Cl.
CPC ............. *H04B 10/25* (2013.01); *G06F 1/105* (2013.01); *H04B 10/25752* (2013.01); *H04B 10/541* (2013.01); *H04B 10/69* (2013.01); *H04L 7/0008* (2013.01); *H04L 7/0075* (2013.01); *H04B 2210/006* (2013.01)

(58) Field of Classification Search
None
See application file for complete search history.

(56) References Cited

U.S. PATENT DOCUMENTS

| | | | | |
|---|---|---|---|---|
| 5,329,393 A | * | 7/1994 | Huang | ............. H04J 14/08 398/155 |
| 5,333,000 A | | 7/1994 | Hietala et al. | |
| 5,375,184 A | | 12/1994 | Sullivan | |

(Continued)

FOREIGN PATENT DOCUMENTS

DE 10333127 A1 * 7/2003 ............... G06F 1/12

OTHER PUBLICATIONS

Katziri et al: "A Sub-Picosecond Hybrid DLL for Large-Scale Phased Array Synchronization", 2018 IEEE A-SSCC, Nov. 5-7, 2018, pp. 231-234 (Year: 2018).*

(Continued)

*Primary Examiner* — Li Liu
(74) *Attorney, Agent, or Firm* — Weaver Austin Villeneuve & Sampson LLP

(57) ABSTRACT

A system includes, in part, a first optical modulator adapted to modulate a first optical signal with a first data to generate a first modulated optical signal, a second optical modulator adapted to modulate a second optical signal with a first clock signal to generate a second modulated optical signal, an optical multiplexer adapted to multiplex the first and second optical signals to generate a multiplexed optical signal, and an optical fiber adapted to carry the multiplexed optical signal. The second optical signal has a second wavelength that is different from the first wavelength.

22 Claims, 6 Drawing Sheets

(51) Int. Cl.
*H04B 10/69* (2013.01)
*H04L 7/00* (2006.01)

(56) References Cited

U.S. PATENT DOCUMENTS

| | | | |
|---|---|---|---|
| 6,574,021 B1* | 6/2003 | Green | H01Q 3/2694 |
| | | | 342/158 |
| 6,587,242 B1* | 7/2003 | Shake | H04J 14/08 |
| | | | 398/98 |
| 7,146,103 B2 | 12/2006 | Yee et al. | |
| 7,149,433 B2 | 12/2006 | Grubb et al. | |
| 7,251,386 B1 | 7/2007 | Dickinson et al. | |
| 7,259,031 B1 | 8/2007 | Dickinson et al. | |
| 7,561,797 B1 | 7/2009 | Harley et al. | |
| 7,787,176 B2 | 8/2010 | Kimerling et al. | |
| 8,213,751 B1 | 7/2012 | Ho et al. | |
| 8,526,828 B2 | 9/2013 | Nakashima et al. | |
| 9,389,441 B2 | 7/2016 | Coult et al. | |
| 9,500,821 B2 | 11/2016 | Hochberg et al. | |
| 9,692,512 B2 | 6/2017 | Griffith et al. | |
| 9,726,840 B2 | 8/2017 | Chen | |
| 10,236,975 B2 | 3/2019 | Li | |
| 10,250,330 B1 | 4/2019 | Cabello et al. | |
| 10,288,804 B2 | 5/2019 | Bao et al. | |
| 10,439,282 B2 | 10/2019 | Murakowski | |
| 10,591,684 B2 | 3/2020 | Shaw | |
| 10,598,968 B2 | 3/2020 | Behroozpour et al. | |
| 10,613,410 B2 | 4/2020 | Hosseini et al. | |
| 10,634,845 B2 | 4/2020 | Aflatouni et al. | |
| 10,656,496 B2 | 5/2020 | Hashemi et al. | |
| 10,790,585 B2 | 9/2020 | Poulton et al. | |
| 10,790,909 B1 | 9/2020 | Suni | |
| 10,866,487 B1 | 12/2020 | Keller et al. | |
| RE48,379 E | 1/2021 | Ho et al. | |
| 10,901,089 B2 | 1/2021 | Zhang et al. | |
| 10,914,900 B1 | 2/2021 | Kendrick et al. | |
| 10,958,356 B2 | 3/2021 | De-Lamberterie et al. | |
| 11,029,578 B2 | 6/2021 | Safavi-Naeini et al. | |
| 11,085,998 B2 | 8/2021 | Sayyah et al. | |
| 11,093,215 B2 | 8/2021 | Harris et al. | |
| 11,105,989 B2 | 8/2021 | Lim | |
| 11,169,780 B2 | 11/2021 | Harris et al. | |
| 11,256,029 B2 | 2/2022 | Kannan et al. | |
| 11,281,972 B2 | 3/2022 | Shen et al. | |
| 11,300,852 B2 | 4/2022 | Wang et al. | |
| 11,307,483 B2 | 4/2022 | Gong et al. | |
| 11,320,588 B1 | 5/2022 | Mazed | |
| 11,340,399 B2 | 5/2022 | Wang et al. | |
| 11,360,270 B2 | 6/2022 | Wang et al. | |
| 11,494,541 B2 | 11/2022 | Ramey et al. | |
| 11,500,072 B2 | 11/2022 | Sarkissian et al. | |
| 11,507,818 B2 | 11/2022 | Hosseinzadeh et al. | |
| 11,520,213 B2 | 12/2022 | Safavi-Naeini et al. | |
| 11,537,025 B2 | 12/2022 | Ni et al. | |
| 11,543,592 B2 | 1/2023 | Dong et al. | |
| 11,562,942 B2 | 1/2023 | Liu et al. | |
| 11,609,742 B2 | 3/2023 | Harris et al. | |
| 11,726,383 B2 | 8/2023 | Hajimiri | |
| 2002/0048071 A1* | 4/2002 | Suzuki | H04B 10/25755 |
| | | | 398/141 |
| 2002/0154371 A1* | 10/2002 | West, Jr. | H04B 10/25755 |
| | | | 398/141 |
| 2003/0048527 A1 | 3/2003 | Kimerling et al. | |
| 2003/0059160 A1* | 3/2003 | Rikitake | H04J 14/025 |
| | | | 385/24 |
| 2003/0133641 A1* | 7/2003 | Yoo | G02B 6/12004 |
| | | | 385/14 |
| 2004/0001248 A1 | 1/2004 | Grubb et al. | |
| 2004/0062469 A1* | 4/2004 | Ionov | H04B 10/11 |
| | | | 385/15 |
| 2004/0208636 A1 | 10/2004 | Reynolds et al. | |
| 2006/0209766 A1* | 9/2006 | Britz | H04Q 11/0003 |
| | | | 370/335 |
| 2009/0028577 A1* | 1/2009 | Oikawa | H04B 10/27 |
| | | | 398/175 |
| 2009/0232508 A1 | 9/2009 | Rumpf et al. | |
| 2010/0316391 A1* | 12/2010 | Shastri | H04B 10/801 |
| | | | 398/141 |
| 2012/0082466 A1 | 4/2012 | Wu et al. | |
| 2012/0092666 A1* | 4/2012 | Meijer | G01J 3/513 |
| | | | 356/326 |
| 2014/0360013 A1 | 12/2014 | Chen | |
| 2015/0180580 A1 | 6/2015 | Coult et al. | |
| 2016/0036529 A1 | 2/2016 | Griffith et al. | |
| 2016/0116688 A1 | 4/2016 | Hochberg et al. | |
| 2017/0033870 A1* | 2/2017 | Dangui | H04B 10/40 |
| 2017/0047987 A1* | 2/2017 | Pellegrino | H04L 27/261 |
| 2018/0039154 A1 | 2/2018 | Hashemi et al. | |
| 2018/0076820 A1* | 3/2018 | Abiri | H03L 7/0996 |
| 2018/0107091 A1 | 4/2018 | Hosseini et al. | |
| 2018/0113256 A1 | 4/2018 | Shaw | |
| 2018/0172908 A1 | 6/2018 | Bao et al. | |
| 2018/0234177 A1 | 8/2018 | Li | |
| 2018/0315877 A1* | 11/2018 | Kelzenberg | B64G 1/443 |
| 2018/0343063 A1 | 11/2018 | Tsunoda | |
| 2019/0028197 A1 | 1/2019 | Turner et al. | |
| 2019/0052365 A1* | 2/2019 | Joseph | H04B 10/1141 |
| 2019/0097724 A1* | 3/2019 | Ye | H04B 10/25754 |
| 2019/0129008 A1 | 5/2019 | Lin et al. | |
| 2019/0227351 A1 | 7/2019 | Behroozpour et al. | |
| 2019/0260123 A1 | 8/2019 | Poulton et al. | |
| 2020/0145110 A1 | 5/2020 | Schuetz et al. | |
| 2020/0192184 A1 | 6/2020 | Safavi-Naeini et al. | |
| 2020/0284883 A1 | 9/2020 | Ferreira et al. | |
| 2020/0373662 A1* | 11/2020 | Gleason | G01S 17/88 |
| 2021/0103199 A1 | 4/2021 | Wu et al. | |
| 2021/0109302 A1 | 4/2021 | Lim | |
| 2021/0116543 A1 | 4/2021 | Huang et al. | |
| 2021/0124024 A1 | 4/2021 | Sarkissian et al. | |
| 2021/0124031 A1 | 4/2021 | Sarkissian et al. | |
| 2021/0124048 A1 | 4/2021 | Sayyah et al. | |
| 2021/0124118 A1 | 4/2021 | Sayyah et al. | |
| 2021/0166991 A1 | 6/2021 | Liu et al. | |
| 2021/0201126 A1 | 7/2021 | Meng et al. | |
| 2021/0224454 A1 | 7/2021 | Ramey et al. | |
| 2021/0278707 A1 | 9/2021 | Moss et al. | |
| 2021/0341814 A1 | 11/2021 | Safavi-Naeini et al. | |
| 2021/0382142 A1 | 12/2021 | Rogers et al. | |
| 2021/0382371 A1 | 12/2021 | Ni et al. | |
| 2021/0392419 A1 | 12/2021 | Meister et al. | |
| 2022/0011430 A1 | 1/2022 | Guo et al. | |
| 2022/0059950 A1 | 2/2022 | Brown et al. | |
| 2022/0091332 A1 | 3/2022 | Yoo et al. | |
| 2022/0091349 A1 | 3/2022 | Testa et al. | |
| 2022/0094459 A1* | 3/2022 | Haraguchi | H04B 10/25133 |
| 2022/0113607 A1 | 4/2022 | Hajimiri | |
| 2022/0128666 A1 | 4/2022 | Schrans et al. | |
| 2022/0146904 A1 | 5/2022 | Hajimiri | |
| 2022/0155526 A1 | 5/2022 | Dong et al. | |
| 2022/0158736 A1 | 5/2022 | Testa et al. | |
| 2022/0179159 A1 | 6/2022 | Wu et al. | |
| 2022/0216922 A1 | 7/2022 | Hashemi | |
| 2022/0283308 A1 | 9/2022 | Schrans et al. | |
| 2022/0291024 A1 | 9/2022 | Camozzi et al. | |
| 2022/0319971 A1 | 10/2022 | Lee et al. | |
| 2022/0334451 A1 | 10/2022 | Wu | |
| 2022/0384409 A1 | 12/2022 | Peng et al. | |
| 2022/0397726 A1 | 12/2022 | Karhade et al. | |
| 2022/0404544 A1 | 12/2022 | Winterbottom et al. | |
| 2022/0404545 A1 | 12/2022 | Winterbottom et al. | |
| 2022/0405056 A1 | 12/2022 | Winterbottom et al. | |
| 2022/0405562 A1 | 12/2022 | Winterbottom et al. | |
| 2022/0405566 A1 | 12/2022 | Winterbottom et al. | |
| 2023/0041793 A1 | 2/2023 | Kurz et al. | |
| 2023/0088198 A1 | 3/2023 | Dong et al. | |

OTHER PUBLICATIONS

International search report and written opinion dated Dec. 27, 2021, in application No. PCT/US2021/050530.

International Search Report and Written Opinion dated Jan. 26, 2022, in PCT Application No. PCT/US2021/054638.

(56) References Cited

OTHER PUBLICATIONS

Prather, D.W., et al., "Optically Upconverted, Spatially Coherent Phased Array-Antenna Feed Networks for Beam-Space MIMO in 5G Cellular Communications", IEEE Transactions on Antennas and Propagation. IEEE, Aug. 3, 2017, vol. 65, No. 12, pp. 6432-6443.
U.S. Final office Action dated Mar. 22, 2023 in U.S. Appl. No. 17/499,798.
U.S. Non-Final Office Action dated Jun. 24, 2022, in U.S. Appl. No. 17/499,798.
U.S. Notice of Allowance dated Mar. 29, 2023 in U.S. Appl. No. 17/501,971.
International Preliminary Report on Patentability dated Apr. 27, 2023 in PCT Application No. PCT/US2021/054638.
International Preliminary Report on Patentability dated Mar. 30, 2023, in PCT Application No. PCT/US2021/050530.
U.S. Non-Final Office Action dated Aug. 3, 2023, in U.S. Appl. No. 17/499,798.
U.S. Notice of Allowance dated Apr. 13, 2023 in U.S. Appl. No. 17/501,971.
U.S. Final Office Action dated Jan. 16, 2024 in U.S. Appl. No. 17/499,798.
U.S. Notice of Allowance dated May 13, 2024 in U.S. Appl. No. 17/499,798.
U.S. Notice of Allowability dated May 29, 2024 in U.S. Appl. No. 17/499,798.

\* cited by examiner

OPTICALLY ENABLED RF PHASED-ARRAYS FOR DATA TRANSMISSION

CROSS REFERENCE TO RELATED APPLICATIONS

The present application claims benefit under 35 USC 119(e) of U.S. Application Ser. No. 63/078,817, filed Sep. 15, 2020, and U.S. Application Ser. No. 63/104,948, filed Oct. 23, 2020, the contents of both of which are incorporated herein by reference in their entirety.

FIELD OF THE INVENTION

The present invention relates to data, clock and control signal transmission, and more particularly to such transmission using opto-electronic devices.

BACKGROUND OF THE INVENTION

RF and mm-wave phased arrays are being increasingly used in the next generation of wireless communication networks. As is known, phased array advantages increase with increasing span (size) and the number of elements disposed in the phased array. This is, in part, due to the fact that the gain, effective isotropic radiated power (EIRP), and the electronics beamforming and beam-steering capabilities of a phased array scale favorably as the number of transmit elements of the phased array increases. Relatively large phased arrays may be used when transmission over relatively long distances, such as in space-based communication systems, are needed.

Phased arrays are gaining widespread commercial use in data communication networks, in part, due to their integration in a semiconductor substrate, such as in CMOS fabrication processes. Integrated circuits (ICs) operating at RF and millimtere wave frequencies, enable integration of a large number of components to make it possible to form cost-effective and scalable phased arrays. In such devices, a timing reference (clock) as well as the data stream are sent to all the elements and sub-units of the phased array. However, as a phased array's size increases, the distribution of the high-speed data to the elements of the phased array poses challenges in complexity, cost, power consumptions, size, mass, and the like. A need thus continues to exist for synchronization and delivery of the clock and data in electronic systems, such as phased arrays.

BRIEF SUMMARY OF THE INVENTION

A system, in accordance with one embodiment of the present disclosure, includes, in part, a first optical modulator adapted to modulate a first optical signal with a first data to generate a first modulated optical signal, a second optical modulator adapted to modulate a second optical signal with a first clock signal to generate a second modulated optical signal, an optical multiplexer adapted to multiplex the first and second optical signals to generate a multiplexed optical signal, and an optical fiber adapted to carry the multiplexed optical signal. The first optical signal has a first wavelength that is different from the first wavelength In one embodiment, the system further includes, in part, a first photodiode adapted to generate a first electrical current in response to the first wavelength of the multiplexed optical signal, and a second photodiode adapted to generate a second electrical current in response to the second wavelength of the multiplexed optical signal. In one embodiment, the first photodiode includes, in part, a first filter responsive to the first wavelength, and the second photodiode includes, in part, a second filter responsive to the second wavelength. In one embodiment, the first filter is deposited on the first photodiode, and the second filter is deposited on the second photodiode.

In one embodiment, the system further includes, in part, a first amplifier adapted to generate a second data in response to the first electrical current, a memory adapted to store the second data, and a second amplifier adapted to generate a second clock signal in response to the second electrical current. In one embodiment, the system further includes, in part, a locked loop circuit adapted to generate a third clock signal in response to the second clock signal, a multitude of adjustable delay elements each adapted to generate a delayed version of the third clock signal in accordance with the stored data, and a multitude of transmit antennas each adapted to transmit an RF signal representative of a different one of the multitude of the delayed versions of the third clock signal.

In one embodiment, the system further includes, in part, a multitude of amplitude modulators each adapted to modulate an amplitude of a different one of the delayed versions of the third clock signal in accordance with the data stored in the memory. In one embodiment, the locked loop circuit is a phase locked loop circuit. In one embodiment, the system further includes, in part, a multitude of power amplifiers each adapted to amplify a different one of the amplitude-modulated signals and deliver the amplified signal to a different one of the transmit antennas.

In one embodiment, the system further includes, in part, a demultiplexer adapted to demultiplex the multiplexed optical signal received from the optical fiber to generate third and fourth optical signals, a first photodiode adapted to generate a first electrical current in response to the third optical signal, and a second photodiode adapted to generate a second electrical current in response to the fourth optical signal. In one embodiment, the demultiplexer is an Echelle demultiplexer.

In one embodiment, the system further includes, in part, a first amplifier adapted to generate a second data in response to the first electrical current, a memory adapted to store the second data, and a second amplifier adapted to generate a second clock signal in response to the second electrical current. In one embodiment, the system further includes, in part, a locked loop circuit adapted to generate a third clock signal in response to the second clock signal, a multitude of adjustable delay elements each adapted to generate a delayed version of the third clock signal in accordance with the stored data, and a multitude of transmit antennas each adapted to transmit an RF signal representative of a different one of the multitude of the delayed versions of the third clock signal.

In one embodiment, the system further includes, in part, a multitude of amplitude modulators each adapted to modulate an amplitude of a different one of the delayed versions of the third clock signal in accordance with the data stored in the memory. In one embodiment, the system further includes, in part, a multitude of power amplifiers each adapted to amplify a different one of the amplitude-modulated signals and deliver the amplified signal to a different one of the transmit antennas.

In one embodiment, the system further includes, in part, a demultiplexer adapted to generate the first data in response to an incoming data received by the demultiplexer. The demultiplexer is further adapted to generate a second data from the incoming data. The system further includes, in part, a third optical modulator adapted to modulate a third optical with the second data to generate a third modulated optical signal. The third optical signal has a third wavelength different from the first and second wavelengths. The multiplexer is further adapted to multiplex the first, second and third optical signals to generate a multiplexed optical signal and deliver the multiplexed optical signal to an optical fiber. In one embodiment, the multiplexers and photodiodes are integrated on a monolithic photonic integrated circuit substrate.

In one embodiment, the system further includes, in part, a third optical modulator adapted to modulate a third optical signal with a first command/control signal to generate a third modulated optical signal. The third optical signal has a third wavelength different from the first and second wavelengths. The optical multiplexer is further adapted to multiplex the first, second, and third optical signals to generate the multiplexed optical signal, and deliver the multiplexed signal to the optical fiber. In one embodiment, the system further includes, in part, a third photodiode adapted to generate a third electrical current in response to the third wavelength of the multiplexed optical signal. In one embodiment, the first and second photodiodes are integrated on a monolithic substrate.

A method of signal delivery, in accordance with one embodiment of the present disclosure, includes, in part, modulating a first optical signal with a first data to generate a first modulated optical signal, modulating a second optical signal with a first clock signal to generate a second modulated optical signal, multiplexing the first and second optical signals to generate a multiplexed optical signal, and delivering the multiplexed optical signal to an optical fiber. The first wavelength is different from the second wavelength.

The method, in accordance with some embodiments, further includes, in part, generating a first electrical current in response to the first wavelength of the multiplexed optical signal received from the optical fiber, and generating a second electrical current in response to the second wavelength of the multiplexed optical signal received from the optical fiber.

In some embodiments, the first electrical current is generated by a first photodiode that includes, in part, a first filter responsive to the first wavelength, and the second electrical current is generated by a second photodiode that includes, in part, a second filter responsive to the second wavelength. In some embodiments, the first filter is deposited on the first photodiode, and the second filter is deposited on the second photodiode.

The method, in accordance with some embodiments, further includes, in part, generating a second data in response to the first electrical current, storing the second data in a memory, and generating a second clock signal in response to the second electrical current. The method, in accordance with some embodiments, further includes, in part, generating a third clock signal in response to and locked to the second clock signal, generating a multitude of delayed versions of the third clock signal in accordance with the stored data, and transmitting a multitude of RF signals each representative of a different one of the multitude of the delayed versions of the third clock signal.

The method, in accordance with some embodiments, further includes, in part, modulating amplitudes of the delayed versions of the third clock signal in accordance with the data stored in the memory. In one embodiment, the third clock signal is generated by a phase locked loop circuit that receives the second clock signal as a reference clock signal.

The method, in accordance with some embodiments, further includes, in part, amplifying the amplitude-modulated signals, and delivering the amplified signals to a multitude of transmit antennas.

The method, in accordance with some embodiments, further includes, in part, demultiplexing the multiplexed optical signal received from the optical fiber to generate third and fourth optical signals, generating a first electrical current in response to the third optical signal, and generating a second electrical current in response to the fourth optical signal. In one embodiment, the demultiplexer is an Echelle demultiplexer.

The method, in accordance with some embodiments, further includes, in part, generating a second data in response to the first electrical current, storing the first data in a memory, and generating a second clock signal in response to the second electrical current. The method, in accordance with some embodiments, further includes, in part, generating a third clock signal in response to and locked to the second clock signal, generating a multitude of delayed versions of the third clock signal in accordance with the stored data, and transmitting a multitude of RF signals each representative of a different one of the plurality of the delayed versions of the third clock signal.

The method, in accordance with some embodiments, further includes, in part, modulating amplitudes of the delayed replicas of the third clock signal in accordance with the data stored in the memory. The method, in accordance with some embodiments, further includes, in part, amplifying the amplitude-modulated signals, and delivering the amplified signals to a multitude of transmit antennas.

The method, in accordance with some embodiments, further includes, in part, generating the first data in response to an incoming data, generating a second data from the incoming data, modulating a third optical signal with the second data to generate a third modulated optical signal, multiplexing the first, second and third optical signals to generate the multiplexed optical signal, and delivering the multiplexed optical signal to the optical fiber. The third optical signal has a third wavelength different from the first and second wavelengths. In one embodiment, the demultiplexing and current generations are performed by components integrated on a monolithic photonic integrated circuit substrate.

The method, in accordance with some embodiments, further includes, in part, modulating a third optical signal with a first command/control signal to generate a third modulated optical signal, multiplexing the first, second and third optical signals to generate the multiplexed optical signal, and delivering the multiplexed optical signal to the optical fiber. The third optical signal has a third wavelength that is different from the first and second wavelengths. The method, in accordance with some embodiments, further includes, in part, generating a third electrical current in response to the third wavelength of the multiplexed optical signal. In one embodiment, the first and second electrical currents are generated by components integrated on a monolithic substrate.

DETAILED DESCRIPTION OF THE INVENTION

In accordance with one embodiment of the present disclosure, an optical signal distributes any combination of data, timing reference, and/or control/housekeeping signals thereby enabling independent operation of various blocks of an IC or multiple ICs. Such an IC(s) may include a phased array or any other type of electronic system. Therefore, other than the optical signal that is generated in accordance with embodiments of the present disclosure, no reference timing signal, and/or data needs to be distributed across the electronic system.

When used in a phased array, embodiments of the present disclosure substantially simplify the construction and/or scaling of the array to larger dimensions, while concurrently lowering the cost and the power consumption of the system. Embodiments of the present disclosure also lower the mass, size, and complexity of the system as light-weight optical fibers, described further below, eliminate the relatively massive and complex metal impedance-controlled transmission lines. Mass is of significance in the space and aerial applications. Distribution of the optical signal across the electronic system (device) may be carried out in various modalities including optical fiber and/or free space. The following embodiments of the present disclosure are described with reference to a phased array. It is understood, however, that the embodiments of the present disclosure are not so limited and equally apply to any electronic system that requires synchronization between and transmission of data, clock and control signals.

In accordance with one embodiment, optical signals with different wavelengths are used to carry the information associated with the clock and data signals. In one embodiment, a first laser beam having a wavelength $\lambda_r$ is modulated with the reference clock signal, and a second laser beam having a wavelength $\lambda_d$ is modulated with the data signal. The modulated optical signals are subsequently multiplexed by an optical multiplexer and delivered to an optical fiber.

Figure 1A:
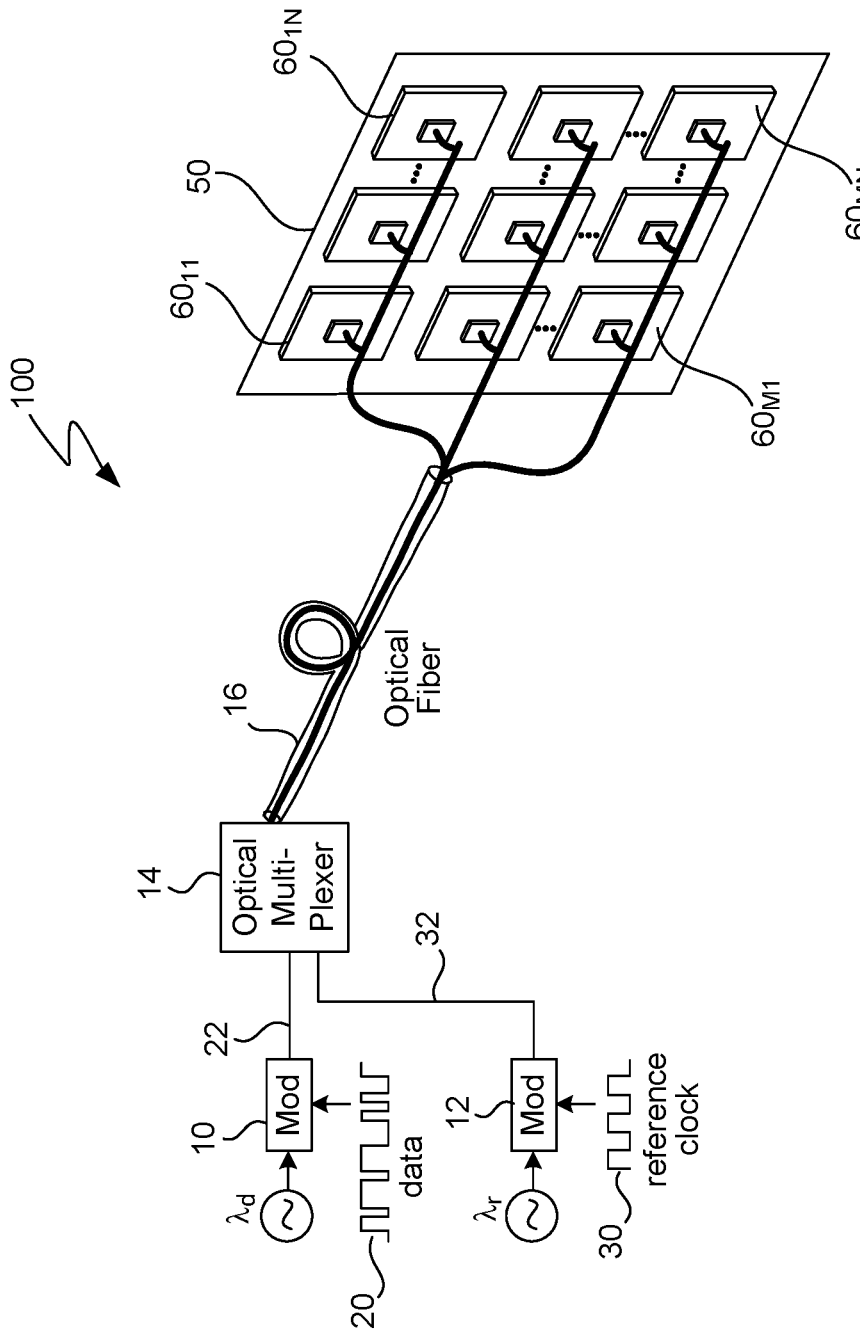
FIG. 1A is a simplified schematic diagram of a data and clock transmission system, in accordance with one exemplary embodiment of the present disclosure.

FIG. 1A is a simplified schematic diagram of a system 100, in accordance with one embodiment of the present disclosure. System 100 is shown as including, in part, a phased array transmitter 50, modulators 10, 12, optical multiplexer 14, and optical fiber 16. Phased array 50 is shown as including M×N transmit elements $60_{ij}$, where i varies from 1 to M, and j varies from 1 to N. Optical signal having a wavelength $\lambda_d$ is modulated with data 20 to generate data-modulated optical signal 22, and optical signal having a wavelength $\lambda_r$ is modulated with the reference clock signal 30 to generate clock-modulated optical signal 32. Optical signals 22 and 32 are multiplexed using optical multiplexer 14 and delivered to transmit elements $60_{ij}$ via optical fiber 16 after being demultiplexed and processed using circuitry described further below.

Modulators 10 and 12 may perform any one of a number of different modulation schemes, either known or developed in the future. Such modulation schemes include, for example, intensity modulation (IM), multi-level pulse amplitude modulation (PAM), phase modulation (PM), quadrature amplitude modulation (QAM), and the like.

The two optical signals carried by optical fiber 16 may be demultiplexed in a variety of ways. In one exemplary embodiment, the two optical signals with wavelengths and $\lambda_d$ impinge on a multitude of silicon-based photodetectors that are partitioned into multiple sections each adapted to have the highest level of sensitivity to a different optical wavelength. This can be achieved using a multitude of different techniques, such as by placing different color filters on the different sections of the photodiodes receiving different signals. The color filters may be formed using any one of the known techniques. For example, the color filters may be formed using pigment or die within a translucent matrix. In another embodiment, the color filters may include, for example, multi-layer wavelength-selective films, or any other wavelength-selective structure that may be deposited, attached, or placed on select sections of the photodiode, as known by those skilled in the art.

Figure 2:
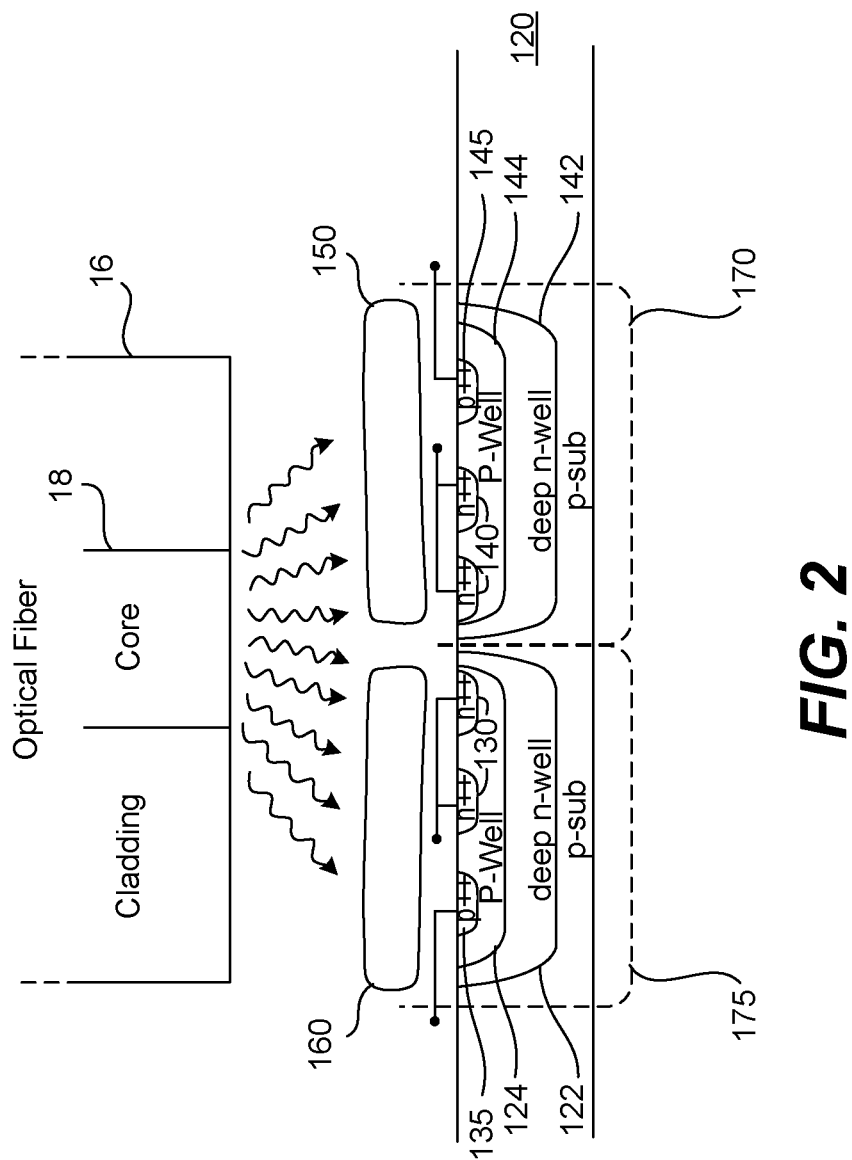
FIG. 2 is a cross-sectional view of a pair of exemplary photodiodes adapted to demultiplex the optical signal received from the optical fiber shown in FIGS. 1A and 1B.

FIG. 2 is a cross-sectional view of a pair of exemplary photodiodes 170 and 175 formed in a p-type semiconductor substrate 120 and adapted to demultiplex the optical signal received from optical fiber 16 of FIG. 1A. Photodiode 170 is shown as including n++ regions 140 and p++ region 145, both of which regions are formed in p-well 144. P-well 144 is form in deep n-well 142, which in turn, is formed in p-substrate 120. Photodiode 175 is shown as including n++ regions 130 and p++ region 135, both of which regions are formed in p-well 124. P-well 124 is form in deep n-well 122, which in turn, is also formed in p-substrate 120. Positioned above photodiode 170 is filter 150 adapted to be sensitive to, for example, wavelength $\lambda_r$. Positioned above photodiode 175 is filter 160 adapted to be sensitive to, for example, wavelength $\lambda_d$. Accordingly, photodiode 170 has the highest sensitivity to wavelength $\lambda_r$ to detect the reference clock signal. In other words, photodiode 170 generates a current signal in response to the optical signal having wavelength $\lambda_r$; similarly, photodiode 175 generates a current signal in response to the optical signal having wavelength that $\lambda_d$, as described above with reference to FIG. 1A. The current signals generated by photodiodes 170 and 175 are therefore representative of the clock signal 30 and data signal 20 shown in FIG. 1A.

Figure 1B:
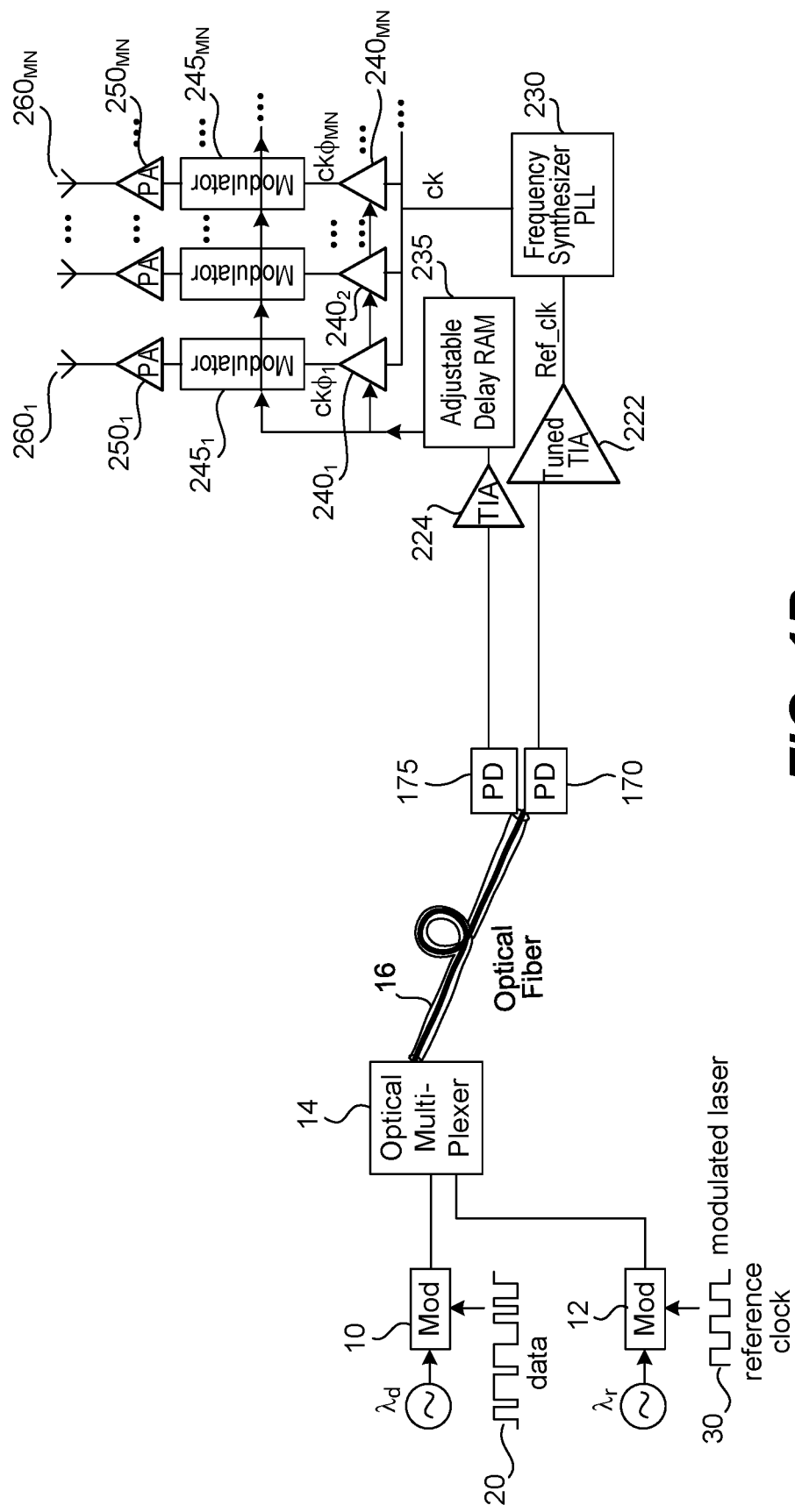
FIG. 1B is a simplified schematic view of the a and clock transmission system, in accordance with one exemplary embodiment of the present disclosure.

FIG. 1B is more detailed view of the data and clock transmission system of FIG. 1A, in accordance with one exemplary embodiment of the present disclosure. The optical signal carried by optical fiber 16 (see FIG. 1A) is shown as impinging on photodiodes 170, 175, as described above with reference to FIG. 2. Photodiodes 170 and 175 convert the received optical signals to electrical signals. In the exemplary embodiment shown in FIG. 1B, the electrical signal representative of the data (as generated by photodiode 175) is converted to a voltage and amplified by trans-impedance amplifier (TIA) 224 before being delivered to and stored in adjustable delay random access memory (RAM) 235. Similarly, the electrical signal representative of the clock signal (as generated by photodiode 170) is converted to aa voltage and amplified by trans-impedance amplifier 222 before being delivered to phase-locked loop (PLL) 230. As described above, photodiode 175 is adapted to be sensitive and highly responsive to optical wavelength $\lambda_d$, and photodiode 170 is adapted to be sensitive and highly responsive to optical wavelength $\lambda_r$.

PLL 230 receives the reference clock signal (Ref_clk) from TIA 222 and, in response, generates a clock signal CK that has a higher frequency than and is locked to signal Ref_Clk. Clock signal CK is applied to each of the M×N (i.e., the number of transmit elements of the exemplary phased array 50 shown in FIG. 1) adjustable delay elements $240_1$, $240_2$ ... $240_{MN}$, the delay across each of which is set in accordance with the data stored in RAM 235. Each of the M×N delayed (phases) replicas of the clock signal CK, namely signals $CK_{\theta 1}$ ... $CK_{\theta MN}$ (generated by delay elements $240_1$ ... $240_{MN}$), is shown as being amplitude-modulated by an associated modulator $245_{ij}$, in accordance with the data stored in RAM 235. Each of the phase and amplitude modulated signals is shown as being amplified by an associated power amplifier (PA) $250_{ij}$ before being delivered to an associated transmit antenna $260_{ij}$ of the phased array for transmission.

In one embodiment, photodiodes 170 and 175 are formed in a photonic integrated circuit. In such embodiments, TIAs 222, 224, adjustable delay RAM 235, PLL 230, adjustable delay elements $240_{ij}$, modulators $245_{ij}$ and amplifiers $250_{ij}$ may be formed in a radio-frequency integrated circuit. In yet other embodiments, photodiodes 170, 175, TIAs 222, 224, adjustable delay RAM 235, PLL 230, adjustable delay elements $240_{ij}$, modulators $245_{ij}$ and amplifiers 250ij are formed in a single semiconductor substrate.

Figure 3:
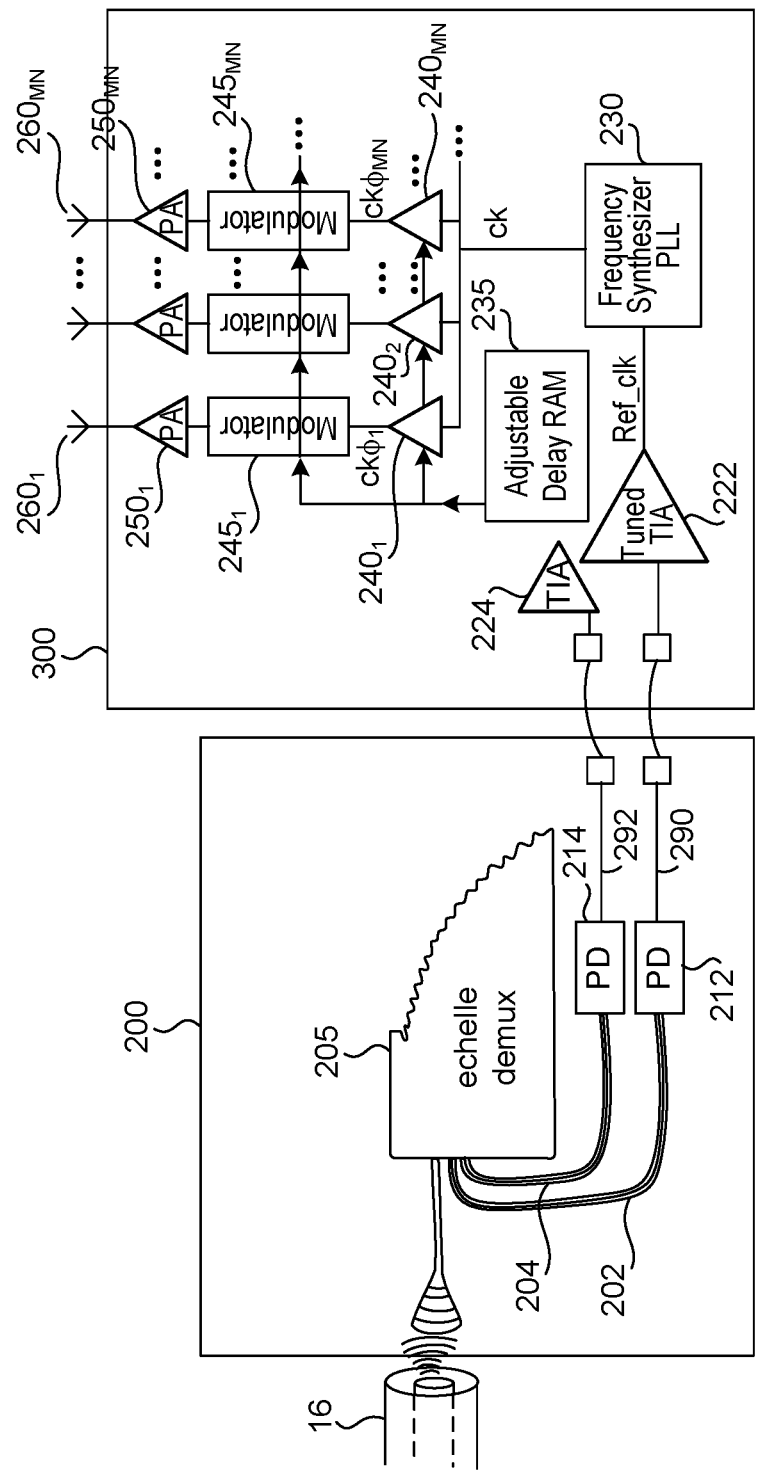
FIG. 3 is a simplified schematic diagram of a data and clock transmission system, in accordance with another exemplary embodiment of the present disclosure.

FIG. 3 is a schematic diagram of a data and clock transmission system, in accordance with another exemplary embodiment of the present disclosure. Optical fiber 16 is shown as carrying modulated and multiplexed data and clock signals, as described above with reference to FIG. 1A. The optical signal carried by optical fiber 16 is received by and demultiplexed by demultiplexer 205 to generate optical data signal 204 and optical clock signal 202. Optical signal 204 impinges on photodiode 214, which in response generates an electrical current signal 292. Similarly, optical signal 202 impinges on photodiode 212, which in response generates an electrical current signal 290. In one embodiment, demultiplexer 205 is an Echelle demultiplexer but it is understood that any other optical demultiplexer may be used. The remaining components and circuitry shown in FIG. 3 (identified as block 300) are similar to those shown in FIG. 1B and operate in the same manner as described with reference to FIG. 1B.

In one embodiment, Echelle demultiplexer 205 as well as photodiodes 212 and 214 are formed in a photonic integrated circuit 200. In such embodiments, TIAs 222, 224, adjustable delay RAM 235, PLL 230, adjustable delay elements $240_{ij}$, modulators $245_{ij}$ and amplifiers $250_{ij}$ are formed in a radio-frequency integrated circuit 300. In yet other embodiments, Echelle demultiplexer 205, photodiodes 212, TIAs 222, 224, adjustable delay RAM 235, PLL 230, adjustable delay elements $240_j$, modulators $245_{ij}$ and amplifiers $250_{ij}$ are formed in a single semiconductor substrate.

One of the challenges of data transmission in a phased array is the timing realignment of the data within various array transmit elements to compensate for the varying free-space delay from array elements to the far-field position where the signal is received. Such delay is a function of the beam pointing direction (e.g., elevation and azimuth angles), which if not properly corrected can cause dispersion in the data transmitted by the array.

Any misalignment between data associated with different array elements may be corrected by providing adjustable delays along the path to each array element. In one embodiment, a dual-port random access memory (RAM) may be used to align the data. To achieve this, the dual-port delay RAM) continuously stores the arriving data and is read off with an address offset that is defined in accordance with the required delay of the array element. For example, for a relatively large array, L=30 meters across, the maximum time delay mismatch at the steepest steering angle of 90° to one side is $\Delta t_{max}$=L/c=30 m/3×108 m/s=100 ns. At the symbol rate of 10 GS/s, this corresponds to 10 kb of memory space. In some embodiments, adjustable delay RAM 235 may be a dual-port RAM that is also used for data alignment. To achieve this, as described above, during any clock cycle, the difference (offset) between the address in which data is being written to and the address from which data is being read, corresponds to the delay used for the alignment between the two data.

Figure 4:
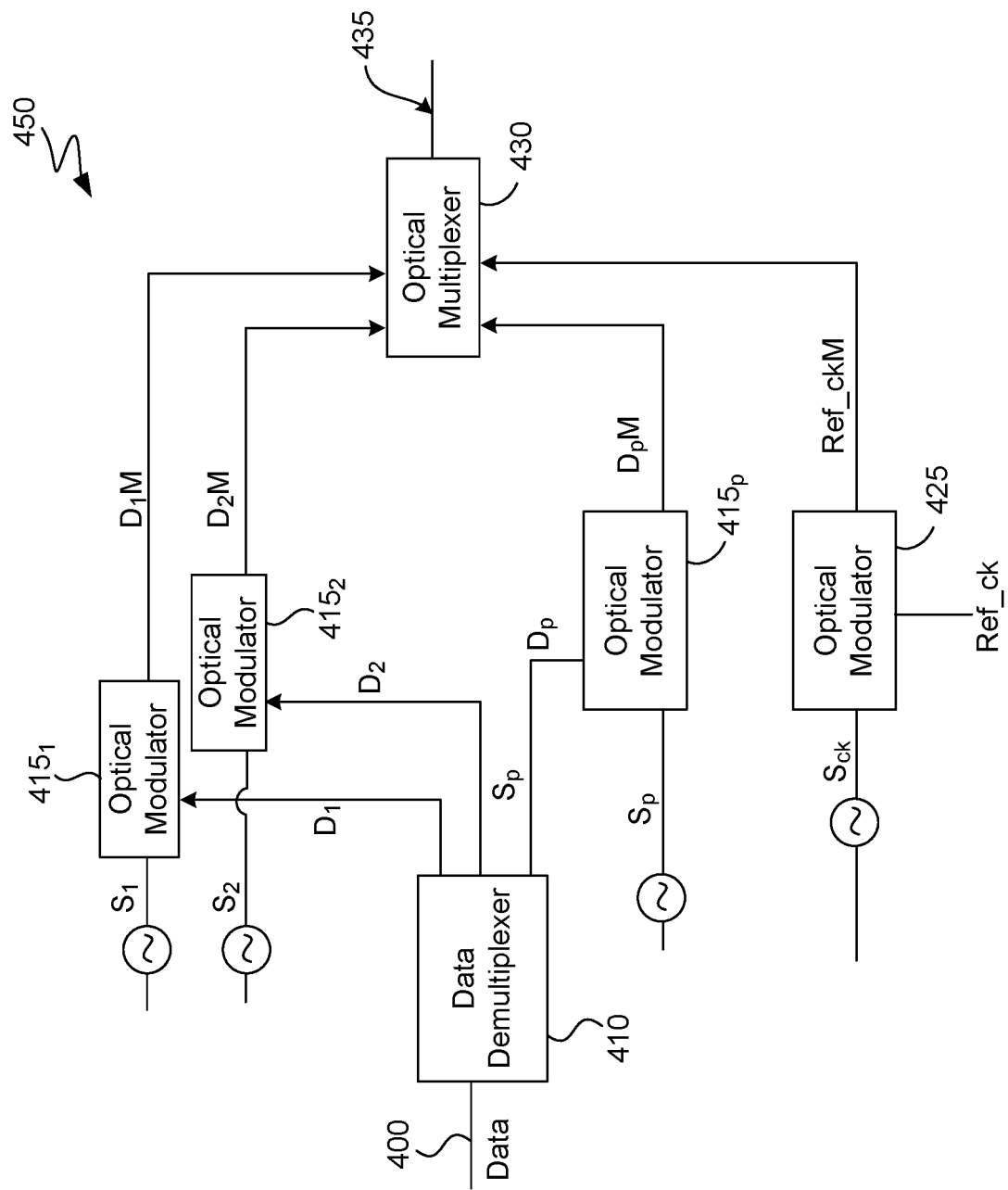
FIG. 4 is a schematic diagram of a data and clock transmission system, in accordance with another exemplary embodiment of the present disclosure.

FIG. 4 is a schematic diagram of a data and clock transmission system, in accordance with another embodiment of the present disclosure. As seen, incoming data 400 is split into a multitude of data streams $D_1, D_2 \ldots D_P$ by data demultiplexer 410. Each of the data streams $D_1, D_2 \ldots D_P$ is used to modulate an optical signal having a different wavelength. For example, optical modulator $415_1$ is adapted to modulate optical signal $S_1$ (having wavelength $\lambda_{d1}$) using data $D_1$ to generate modulated optical signal $D_{1M}$, optical modulator $415_2$ is adapted to modulate optical signal $S_2$ (having wavelength $\lambda_{d1}$) using data $D_2$ to generate modulated optical signal $D_{2M}$, and optical modulator $415_P$ is adapted to modulate optical signal $S_P$ (having wavelength $\lambda_{dP}$) using data $D_P$ to generate modulated optical signal $D_{PM}$. Optical modulator 425 is adapted to modulate optical signal $S_{CK}$ (having wavelength $\lambda_r$) using reference clock signal Ref_CK to generate modulated optical signal Ref_CKM. The modulated optical signals $D_{1M}, D_{2M} \ldots D_{PM}$, Ref_CKM are then multiplexed by optical multiplexer 430 and delivered to optical fiber 435. Because the incoming data 400 is split into multiple streams, each of which is used to modulate a different optical signal wavelength, a higher data rate is achieved.

In one embodiment, optical multiplexer 430 may perform wavelength division multiplexing. In some embodiments, when the incoming data is split into a pair of data streams, the optical signal pair may be modulated with in-phase (I) and quadrature phases (Q) signals to enable the generation of a constellation of symbols associated with any modulation scheme, such as QPSk, QAM, and the like.

As described above with reference to FIG. 3, in one embodiment, the multiplexed optical signals carried by an optical fiber are delivered to a photonic integrated circuit (PIC) (such as PIC 200) adapted to couple the multiplexed optical signals to an optical demultiplexer—such as Echelle demultiplexer 205. The optical demultiplexer then separates different wavelengths of the optical signals and guides them through on-chip waveguides. The waveguides, in turn, supply the signals propagating therethrough to individual photo diodes (such as photodiodes 212, 214 that may be disposed on or off the PIC) to convert the optical signals into corresponding electrical signals.

In some embodiments, the processing of the electrical signals may be performed by a mm-wave or radio frequency integrated circuit, such as IC 300 shown in FIG. 3. In some embodiments, the PIC adapted to process the optical signals may include Germanium photo detectors, thereby to enable the use of multiple bands within the communication optical wavelengths (for example, ~1,550 nm and ~1,310 nm) to transmit various signals. In some embodiments, the processing of optical and electrical signals may be performed by optical components, opto-electronic components as well as electronic circuitry formed on the same substrate, such as silicon-on-insulator (SOI) substrates.

In some embodiments, the demultiplexing operation may be achieved using, for example, Mach-Zehnder demultiplexer, cascaded filters, ring resonators, integrated or discrete Echelle gratings demultiplexers, and the like. In some embodiments, the demultiplexing and/or optical-to-electrical conversion may be achieved using components that are external to the monolithic substrate in which other components of the data/clock transmission and recovery system, in accordance with embodiments of the present disclosure, are formed.

The modulation of the optical signal with data, timing reference, and/or control signals prior to their multiplexing and coupling to an optical fiber may be performed using, for example, a Mach-Zehnder modulator, electro-absorption modulator, or direct modulation of a laser source using, for example, a vertical cavity surface emitting laser (VCSEL).

In some embodiments, the data and reference clock are synchronized before being modulated and delivered to an optical fiber. The synchronization may be achieved directly, harmonically, sub-harmonically, or fractionally. Such synchronization enables each array element and/or array subunit to dispense the need for additional clock and data recovery circuits, thereby simplifying the operation to a sampling, sub-sampling, or super-sampling within each phased array element. This, in turn, results in substantial savings in overhead, cost, complexity, and power.

Figure 5:
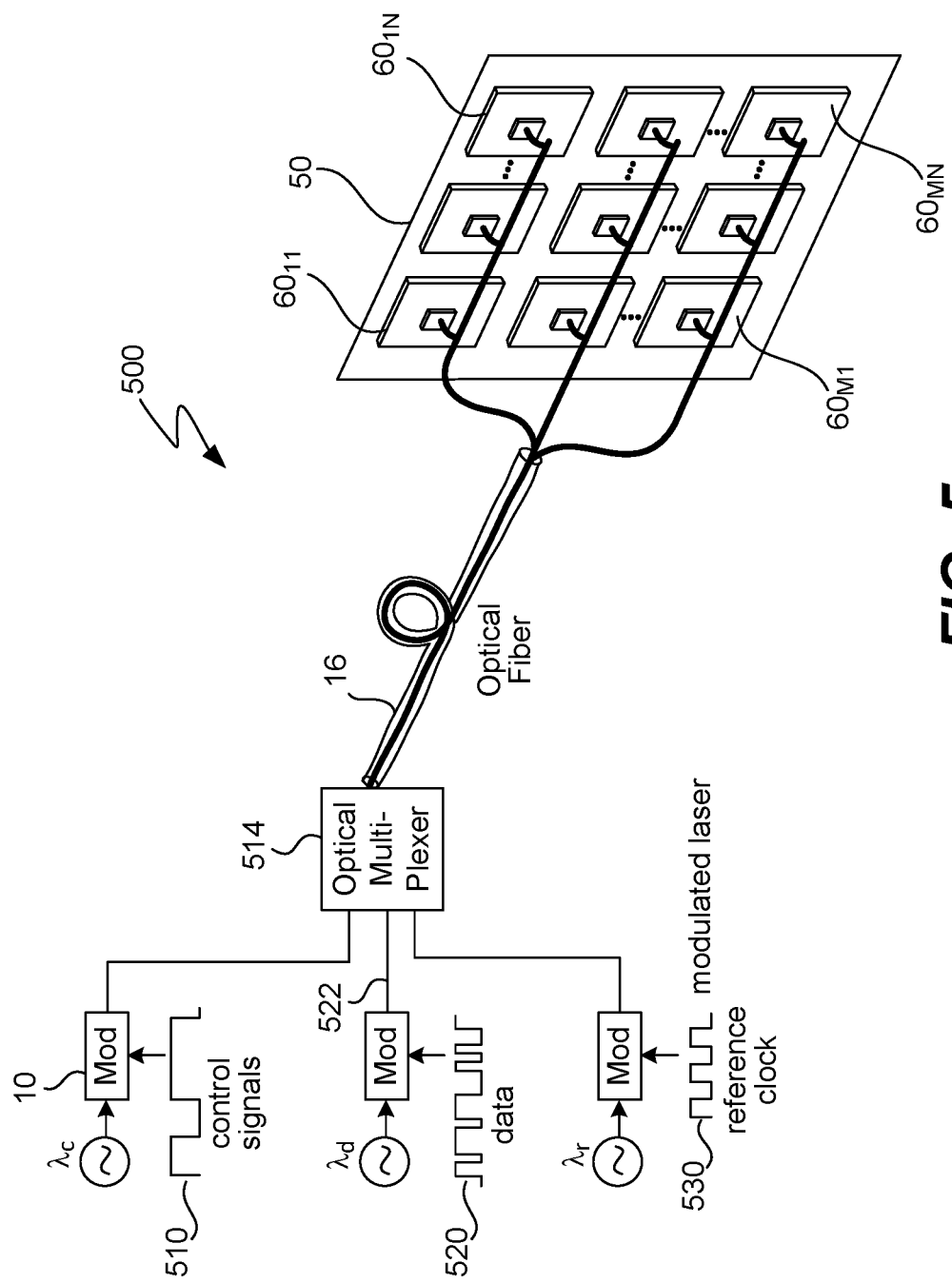
FIG. 5 is a schematic diagram of a data and clock transmission system, in accordance with another exemplary embodiment of the present disclosure.

In addition to the timing reference (clock) and data, control and housekeeping signal may also be transmitted optically to various array elements. FIG. 5 is a simplified schematic diagram of a system 500, in accordance with another exemplary embodiment of the present disclosure. System 500 is shown as including, in part, a phased array transmitter 50, modulators 508, 510, 512, an optical multiplexer 14, and an optical fiber 16. Phased array 50 is shown as including M×N transmit elements $60_{ij}$, where i varies from 1 to M, and j varies from 1 to N. Optical signal having wavelength $\lambda_d$ is modulated with data 520 to generate data-modulated optical signal 522. Optical signal having wavelength $\lambda_r$ is modulated with the reference clock signal 530 to generate clock-modulated optical signal 532. Optical signal having wavelength $\lambda_C$ is modulated with the control signal 540 to generate control-modulated optical signal 542. Optical signals 522, 532 and 542 are multiplexed using optical multiplexer 514 and delivered to transmit elements $60_{ij}$ via optical fiber 16. Therefore, the need for any electrical connectivity among the individual array elements is dispensed with. Embodiments of the present disclosure thus simplify the array backbone and infrastructure substantially. In some embodiment, the lower information rate associated with the control channels may further be used to simply the design. The data intended for different array elements may be identified by introduction of a header in the messages sent to each array element.

The above embodiments of the present invention are illustrative and not limitative. The above embodiments of the present invention are not limited by the number of array elements, the type of modulators, multiplexers, demultiplexers, and the like. The above embodiments of the present invention are not limited by the wavelength or frequency of the signal being transmitted. Other modifications and variations will be apparent to those skilled in the art and are intended to fall within the scope of the appended claims.

What is claimed is:

1. A system comprising:
a first optical modulator adapted to modulate a first optical signal with a first data to generate a first modulated optical signal, the first optical signal having a first wavelength;
a second optical modulator adapted to modulate a second optical signal with a first clock signal to generate a second modulated optical signal, the second optical signal having a second wavelength different from the first wavelength;
an optical multiplexer adapted to multiplex the first and second optical signals to generate a multiplexed optical signal;
an optical fiber adapted to carry the multiplexed optical signal;
a first photodiode adapted to generate a first electrical current in response to the first wavelength of the multiplexed optical signal;
a second photodiode adapted to generate a second electrical current in response to the second wavelength of the multiplexed optical signal
a first amplifier adapted to generate a second data in response to the first electrical current;
a memory adapted to store the second data;
a second amplifier adapted to generate a second clock signal in response to the second electrical current;
a locked loop circuit adapted to generate a third clock signal in response to the second clock signal; and
a plurality of adjustable delay elements each adapted to generate a delayed replica of the third clock signal in accordance with the stored data.

2. The system of claim 1 wherein said first photodiode comprises a first filter responsive to the first wavelength, and wherein said second photodiode comprises a second filter responsive to the second wavelength.

3. The system of claim 2 wherein said first filter is deposited on the first photodiode, and wherein said second filter is deposited on the second photodiode.

4. The system of claim 1 further comprising:
a plurality of transmit antennas each adapted to transmit an RF signal representative of a different one of the plurality of the delayed replicas of the third clock signal.

5. The system of claim 1 further comprising:
a plurality of amplitude modulators each adapted to modulate an amplitude of a different one of the delayed replicas of the third clock signal in accordance with the data stored in the memory.

6. The system of claim 5 wherein said locked loop circuit is a phase locked loop circuit.

7. The system of claim 6 further comprising:
a plurality of power amplifiers each adapted to amplify a different one of the amplitude-modulated signals and deliver the amplified signal to a different one of the transmit antennas.

8. The system of claim 1 further comprising:
a demultiplexer adapted to generate the first data in response to an incoming data received by the demultiplexer, said demultiplexer further adapted to generate a second data from the incoming data; and
a third optical modulator adapted to modulate a third optical signal with the second data to generate a third modulated optical signal, the third optical signal having a third wavelength different from the first and second wavelengths, wherein said multiplexer is further adapted to multiplex the first, second and third optical signals to generate the multiplexed optical signal and deliver the multiplexed optical signal to the optical fiber.

9. The system of claim 1 further comprising:
a third optical modulator adapted to modulate a third optical signal with a first command/control signal to generate a third modulated optical signal, the third optical signal having a third wavelength different from the first and second wavelengths, wherein the optical multiplexer is further adapted to multiplex the first, second, and third optical signals to generate the multiplexed optical signal, and deliver the multiplexed signal to the optical fiber.

10. The system of claim 9 further comprising:
a third photodiode adapted to generate a third electrical current in response to the third wavelength of the multiplexed optical signal.

11. The system of claim 1 wherein said first and second photodiodes are integrated on a monolithic substrate.

12. A method of signal delivery comprising:
modulating a first optical signal with a first data to generate a first modulated optical signal, the first optical signal having a first wavelength;
modulating a second optical signal with a first clock signal to generate a second modulated optical signal, the second optical signal having a second wavelength different from the first wavelength;
multiplexing the first and second optical signals to generate a multiplexed optical signal;
delivering the multiplexed optical signal to an optical fiber;
generating a first electrical current in response to the first wavelength of the multiplexed optical signal received from the optical fiber;
generating a second electrical current in response to the second wavelength of the multiplexed optical signal received from the optical fiber
generating a second data in response to the first electrical current;
storing the second data in a memory;
generating a second clock signal in response to the second electrical current,
generating a third clock signal in response and locked to the second clock signal; and
generating a plurality of delayed replicas of the third clock signal in accordance with the stored data.

13. The method of claim 12 wherein said first electrical current is generated by a first photodiode that comprises a first filter responsive to the first wavelength, and wherein said second electrical current is generated by a second photodiode that comprises a second filter responsive to the second wavelength.

14. The method of claim 12 wherein said first filter is deposited on the first photodiode, and wherein said second filter is deposited on the second photodiode.

15. The method of claim 12 further comprising:
transmitting a plurality of RF signals each representative of a different one of the plurality of the delayed replicas of the third clock signal.

16. The method of claim 12 further comprising:
modulating amplitudes of the delayed replicas of the third clock signal in accordance with the data stored in the memory.

17. The method of claim 16 wherein said third clock signal is generated by a phase locked loop circuit that receives the second clock signal as a reference clock signal.

18. The method of claim 17 further comprising:
amplifying the amplitude-modulated signals; and
delivering the amplified signals to a plurality of transmit antennas.

19. The method of claim 12 further comprising:
generating the first data in response to an incoming data;
generating a second data from the incoming data;
modulating a third optical with the second data to generate a third modulated optical signal, the third optical signal having a third wavelength different from the first and second wavelengths;
multiplexing the first, second and third optical signals to generate the multiplexed optical signal; and
delivering the multiplexed optical signal to the optical fiber.

20. The method of claim 12 further comprising:
modulating a third optical signal with a first command/control signal to generate a third modulated optical signal, the third optical signal having a third wavelength different from the first and second wavelengths;
multiplexing the first, second and third optical signals to generate the multiplexed optical signal; and
delivering the multiplexed optical signal to the optical fiber.

21. The method of claim 20 further comprising:
generating a third electrical current in response to the third wavelength of the multiplexed optical signal.

22. The method of claim 12 wherein the first and second electrical currents are generated by components integrated on a monolithic substrate.

* * * * *